(12) United States Patent
Hedayat et al.

(10) Patent No.: US 8,599,735 B2
(45) Date of Patent: Dec. 3, 2013

(54) GROUP ADDRESSING FOR MULTICAST TRANSMISSIONS FOR POWER SAVINGS AT PHYSICAL LAYER

(75) Inventors: Ahmadreza Hedayat, Allen, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 13/232,532

(22) Filed: Sep. 14, 2011

(65) Prior Publication Data

US 2013/0064161 A1    Mar. 14, 2013

(51) Int. Cl.
*H04J 3/24* (2006.01)
(52) U.S. Cl.
USPC .......................... 370/312; 370/474
(58) Field of Classification Search
USPC .................. 370/311, 312, 329, 473, 474
See application file for complete search history.

(56) References Cited

U.S. PATENT DOCUMENTS

| | | | |
|---|---|---|---|
| 7,872,997 B2* | 1/2011 | Qian | 370/312 |
| 2003/0031145 A1* | 2/2003 | Zeira et al. | 370/335 |
| 2007/0189207 A1* | 8/2007 | Sammour et al. | 370/328 |
| 2008/0101269 A1* | 5/2008 | Jung et al. | 370/312 |
| 2009/0279470 A1* | 11/2009 | Seok | 370/312 |
| 2011/0064040 A1* | 3/2011 | Kim et al. | 370/329 |
| 2011/0093540 A1* | 4/2011 | Eisenberg et al. | 709/205 |
| 2011/0096796 A1* | 4/2011 | Zhang et al. | 370/474 |
| 2011/0103280 A1* | 5/2011 | Liu et al. | 370/311 |
| 2011/0128929 A1 | 6/2011 | Liu et al. | |
| 2012/0314617 A1* | 12/2012 | Erichsen et al. | 370/254 |

FOREIGN PATENT DOCUMENTS

EP    2357773 A2    8/2011

OTHER PUBLICATIONS

International Search Report and Written Opinion in corresponding International Application No. PCT/US2012/051030, mailed Nov. 13, 2012.
Jarkko Kneckt, Group Addressed MSDUs in 802.11ac, doc.: IEEE 802.11-yy/xxxxr0, Jul. 12, 2011, (10 slides).
Jarkko Kneckt et al., SU-MIMO Type for Group Addressed Frames, doc IEEE 802.11-11/0313rI, Mar. 14, 2011, (11 slides).
Jarkko Kneckt et al., Indication of Group Address in PLCP Header, doc IEEE 802.11-11/0096rO, Jan. 17, 2011, (10 slides).

* cited by examiner

*Primary Examiner* — Michael Thier
*Assistant Examiner* — Prince A Mensah
(74) *Attorney, Agent, or Firm* — Edell, Shapiro & Finnan, LLC

(57) ABSTRACT

Techniques are provided to enable group addressing for multicast transmissions in a frame that is configured to support multi-user transmissions. The frame comprises a header field that is configured to indicate to recipient devices associated with a multi-user transmission interval during which time, frequency and spatial channel resources are allocated to allow for the transmission of a data frame or simultaneous transmission of corresponding ones of a plurality of data frames to respective recipient devices. In the header field, group identification information is wirelessly transmitted that indicates a group of recipient devices which are to receive a transmission during the multi-user transmission interval. Data is wirelessly transmitted for a multicast transmission during the multi-user transmission interval that follows the header field, where the multicast transmission is intended for a group of recipient devices that are members of a multicast group corresponding to group identification information contained in the header field.

16 Claims, 7 Drawing Sheets

| VHT-SIGA1 IN MULTI-USER FRAMES | LENGTH (BITS) |
|---|---|
| BANDWIDTH (20/40/80/{160/80+80}) | 2 |
| STBC (2N*N ONLY) | 1 |
| GID (0 TO 62) | 6 |
| NSTS (1-8) FOR USER 1 | 3 |
| NSTS (1-8) FOR USER 2 | 3 |
| NSTS (1-8) FOR USER 3 | 3 |
| NSTS (1-8) FOR USER 4 | 3 |
| NO TXOP PS | 1 |
| RESERVED | 2 |

GROUP ADDRESSING FOR MULTICAST TRANSMISSIONS FOR POWER SAVINGS AT PHYSICAL LAYER

TECHNICAL FIELD

The present disclosure relates to wireless communication.

BACKGROUND

In communication networks, it is often useful to send the same data to multiple devices at the same time. This is known as a multicast transmission and the devices that are to receive that data are referred to as members of a group or multicast group. Multicasting is useful in both wired and wireless networks.

Wireless networks have the additional restriction that many devices are portable and thus powered by a depleting power supply, e.g., rechargeable batteries. In current wireless networks, there is no means at the physical layer of a frame to address and identify a multicast group. As a result, the multicast frames have to be processed by all devices all the way from physical (PHY) layer/portion of the frame to the media access control (MAC) layer/portion of the frame.

BRIEF DESCRIPTION OF THE DRAWINGS

FIG. 4 illustrates examples of the format of the content placed into a header field to indicate that a multicast transmission is to follow for a particular multicast group during the multi-user transmission interval of the frame.

DESCRIPTION OF EXAMPLE EMBODIMENTS

Overview

Techniques are provided to enable group addressing for multicast transmissions to wireless devices in a frame that is configured to support multi-user transmissions. The frame comprises a header field that is configured to indicate to recipient devices associated with a multi-user transmission interval during which time, frequency and spatial channel resources are allocated to allow for the transmission of a data frame or simultaneous transmission of corresponding ones of a plurality of data frames to respective recipient devices. In the header field, group identification information is wirelessly transmitted that indicates a group of recipient devices which are to receive a transmission during the multi-user transmission interval. Data is wirelessly transmitted for a multicast transmission during the multi-user transmission interval that follows the header field, where the multicast transmission is intended for a group of recipient devices that are members of a multicast group corresponding to the group identification information contained in the header field.

Example Embodiments

Figure 1:
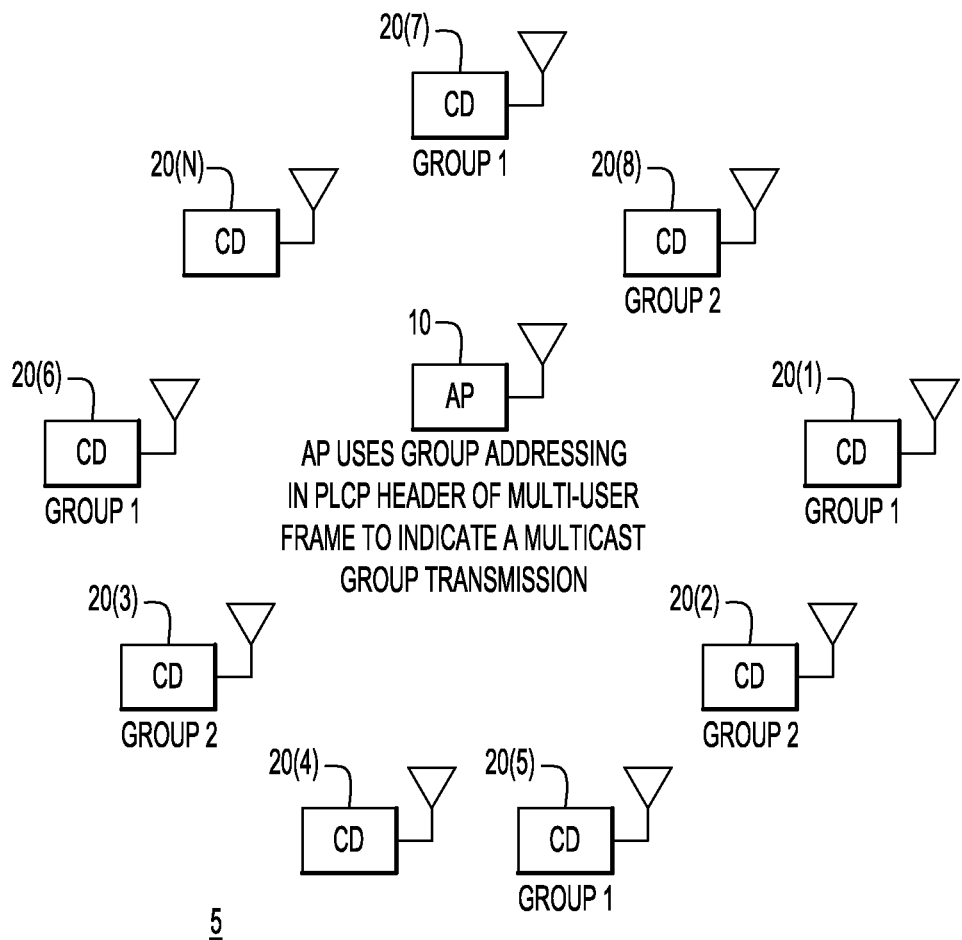
FIG. 1 is a diagram of a wireless network in which a wireless access point device is configured to use a multi-user transmission interval of a multi-user frame to send a multicast frame to a group of recipient devices.

Referring first to FIG. 1, a diagram is shown of a wireless communication network 5 comprising a wireless access point device (AP) 10 and a plurality of wireless client devices 20(1)-20(N). In one example, the wireless access point device 10 and wireless client devices 20(1)-20(N) are configured to wirelessly communicate in accordance with the IEEE 802.11ac wireless local area network (WLAN) communication standard. The IEEE 802.11ac standard provides for a multi-user frame in which an AP can send a data frame to a plurality of recipient devices or simultaneously send corresponding ones of a plurality of data frames to respective recipient devices utilizing time, frequency and spatial channel resources of a frequency band and multiple-input multiple-output (MIMO) transmission techniques. The simultaneous transmission of corresponding ones of a plurality of data frames to respective recipient devices is known as a "Multi-User MIMO" technique. Other wireless communication standards or systems now known or hereinafter developed may have similar multi-user transmission capability, and the techniques described herein are applicable to such standards or systems.

There is another type of transmission, known as a multicast transmission, where the same data is sent to a group of recipient client devices that are part of what is called a multicast group. Group or multicast addressing at media access control (MAC) and higher layers helps to optimize error protection and inter-packet forward error correction (FEC) through assignment of appropriate FEC rates.

In current multi-user wireless communication scenarios, there is no means to address and identify a multicast group at the physical (PHY) layer of transmission frame. For example, in the IEEE 802.11a/b/g/n/ac standards, there is no PHY-layer addressing for multicast packets and consequently all client devices need to process multicast packets all the way to MAC or higher layers after which non-intended recipient devices can discard the packets. This is a waste of processing resources for the non-intended client devices.

It would be very beneficial to indicate multicast groups at the PHY layer so that non-intended client devices can drop the multicast packets early on and operate in a power-save mode for the rest of the data unit interval. Currently, there is no means in the Physical Layer Convergence Procedure (PLCP) header of IEEE 802.11ac multi-user frames to address the intended recipients of a multicast PCLP Data Unit (PPDU). However, according to the techniques described herein, an existing field in the IEEE 802.11ac PLCP header is re-used for multicast group addressing.

Figure 2:
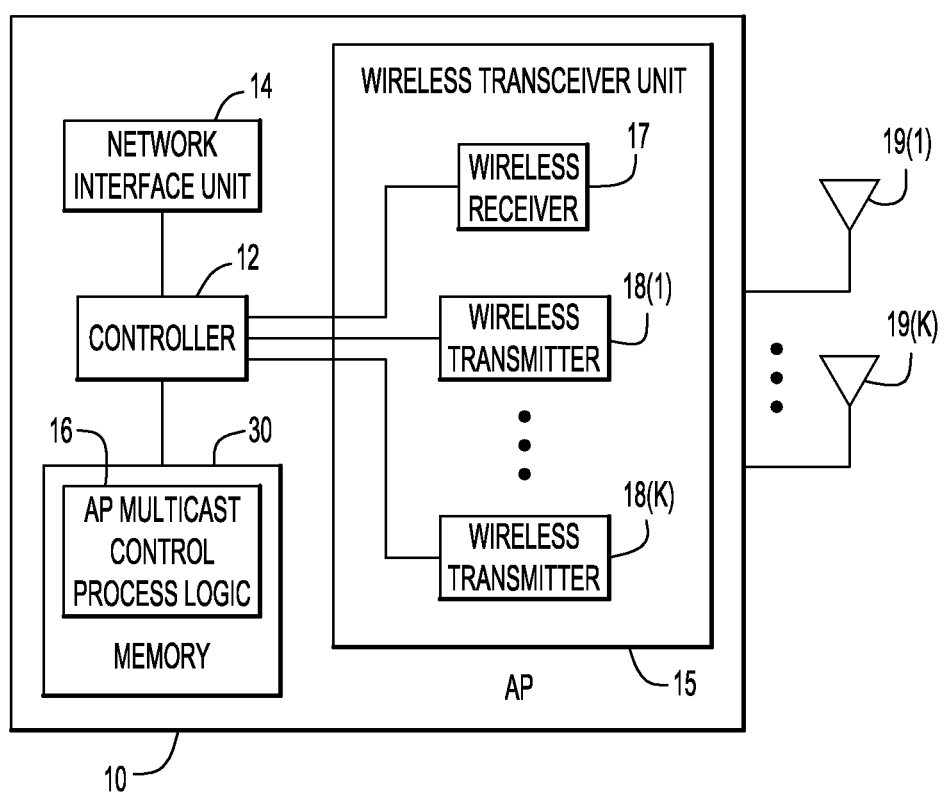
FIG. 2 is a block diagram of an example wireless access point device configured to transmit a multicast frame during a multi-user transmission interval of a multi-user frame.

Accordingly, the AP 10 is configured to use group addressing in the PLCP header of a multi-user frame to indicate a multicast group transmission. For example, assume that the AP 10 has a data frame queued up that is intended for client devices 20(1), 20(5), 20(6) and 20(7). The AP 10 may assign the client devices to a multicast group, announce in advance to them that they are part of a particular multicast group, e.g., Group 1, (including sending them a group identifier and additional information described herein), subsequently send in the PLCP header of a multi-user frame the group identifier for that group and then the data frame for the multicast transmission in the multi-user transmission interval, e.g., the PPDU field, that comes after the PCLP Header. The AP 10 may follow a similar procedure to send a data frame to each of client devices 20(2), 20(3) and 30(8) by assigning them to a different multicast group, e.g., Group 2 and sending a different group identifier, etc. A client device can be part of more than one multicast group at any given time. For example, client device 20(1) can be part of Group 1 and Group 2. Turning now to FIG. 2, an example block diagram is described of the AP 10 that is configured to perform these multicast group addressing techniques. The AP 10 comprises a controller 12, a network interface unit 14 for wired network communications, memory 16, a wireless receiver 17, and a plurality of wireless transmitters 18(1)-18(K). The AP 10 also comprises one or more antennas 19(1)-19(K). While only a single wireless receiver 17 is shown, this is by way of example only and in fact only one receiver is required. However, it is possible that the AP 10 may have multiple receivers. Moreover, it is possible that a single transmitter may be used to perform the functions of the plurality of transmitters 18(1)-18(K). Thus, for simplicity, the block of transmitters 18(1)-18(K) may be implemented by at least one transmitter.

The WLAN receiver 17 performs the necessary baseband signal demodulation as well as radio frequency (RF) receive processing for WLAN communications. Similarly, the multiple wireless transmitters 18(1)-18(K) are each capable for performing the necessary baseband signal modulation and RF transmit process functions. The wireless receiver 17 and transmitters 18(1)-18(K) may be included as part of a wireless transceiver unit 15 that may comprise one or more application integrated circuits. The controller 12 is, for example, a microprocessor or microcontroller, or alternatively is a programmable digital signal processor, or a fixed or programmable digital logic device.

The memory 16 stores data that is used by the controller 12 for controlling functions of the AP 10. In addition, the memory 18 stores instructions for AP multicast control process logic 30 that, when executed by the controller 12, cause the controller to perform the operations described herein in connection with FIGS. 3-6.

The memory 16 may comprise read only memory (ROM), random access memory (RAM), magnetic disk storage media devices, optical storage media devices, flash memory devices, electrical, optical, or other physical/tangible memory storage devices. Again, the controller 12 is, for example, a microprocessor or microcontroller that executes instructions for the AP multicast control process logic 30. Thus, in general, the memory 16 may comprise one or more tangible computer readable storage media (e.g., a memory device) encoded with software comprising computer executable instructions and when the software is executed (by the controller 12) it is operable to perform the operations described herein.

Figure 3:
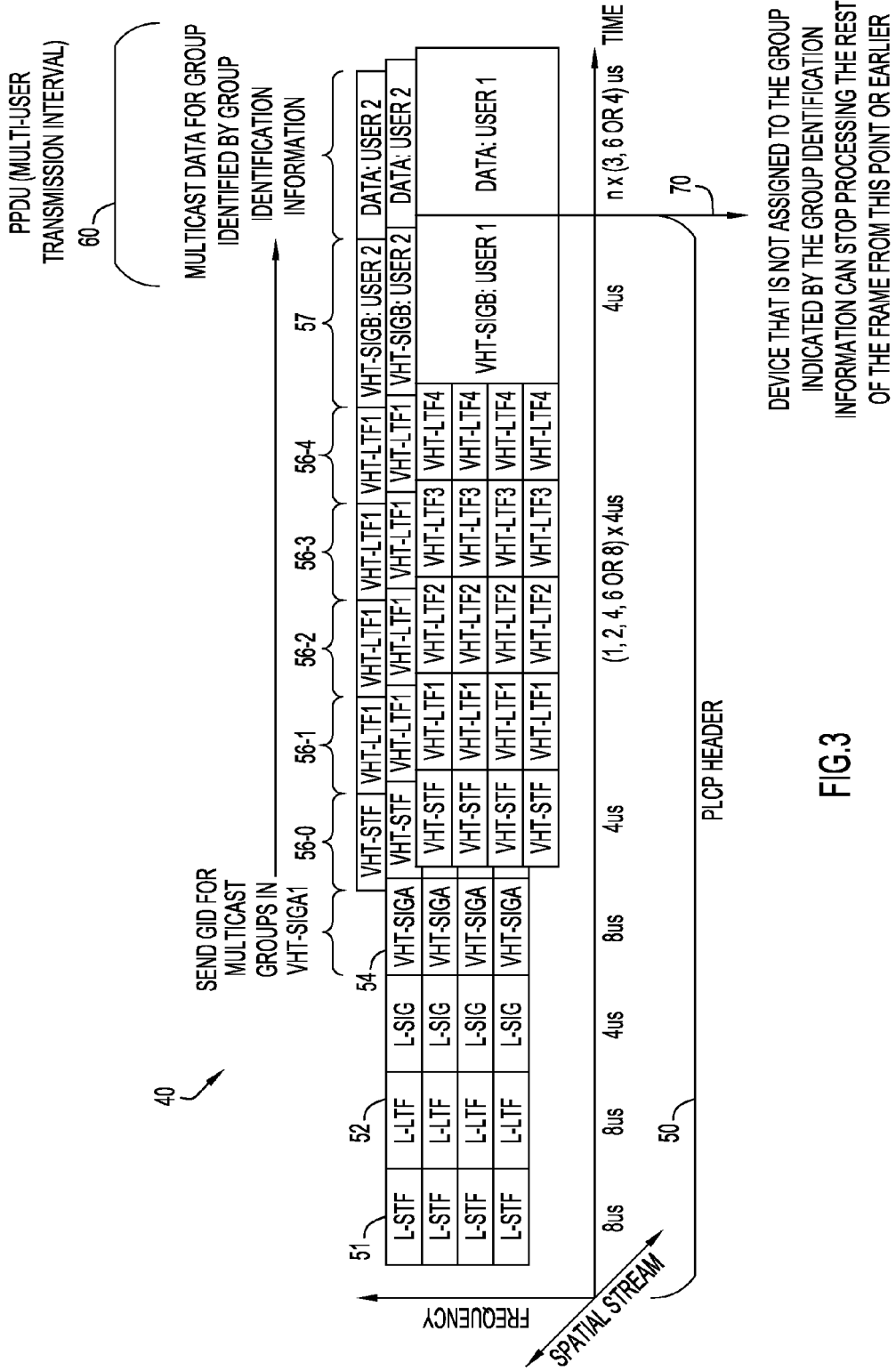
FIG. 3 is a diagram of a multi-user frame and illustrating the use of a header field of the frame to indicate that a multicast transmission is to follow for a particular multicast group during the multi-user transmission interval of the frame.

Reference is now made to FIG. 3. FIG. 3 illustrates an example of a multi-user frame 40 in accordance with the IEEE 802.11ac standard. The frame 40 comprises a PLCP header 50 followed by a PPDU 60 that is also referred to herein as a multi-user transmission interval. The multi-user transmission interval may be used to transmit a common data frame to multiple recipient devices or different data frames simultaneously to respective recipient devices, i.e., Multi-User MIMO transmissions. Multi-User MIMO (MU-MIMO) transmissions were introduced in IEEE 802.11ac wherein individual payloads are sent to several clients simultaneously.

The PLCP header 50 comprises several fields including Legacy-Short Training Fields (L-STF) 51 and 52, a Legacy Signal (L-SIG) field 53, and a Very High Throughput Signal (VHT-SIGA) field 54. The VHT-SIGA field 54 comprises two symbols. In the first symbol, called VHT-SIGA1, there is a group identifier (GID) sub-field. In the PLCP header 50, the AP addresses the recipients of a multi-user PPDU by the GID sub-field within the VHT-SIGA field 54. Prior to sending a multi-user transmission, the AP announces and updates all GIDs and the membership of each GID (within one or more Group ID Management frames), i.e., which client devices are part of which group. In addition, there are several VHT training fields including a VHT-STF 56-0, VHT-LTF1 56-1, VHT-LTF2 56-2, VHT-LTF3 56-3, VHT-LTF4 56-4 and a VHT-SIGB field 57 in the PLCP header 50.

Currently, in IEEE 802.11ac the purpose of the GID is to indicate to client devices whether the PPDU that follows the PLCP header 50 is a multi-user or single-user PPDU. A client device determines whether it is a member of the group for a PPDU by detecting the GID field and comparing it to any GIDs that the AP had previously sent to the client device in a Group ID Management frame. If the client device determines that it is not a member of the group indicated by the GID in the VHT-SIGA field 54, it can stop processing the PPDU further and drop the frame.

There are a plurality of GIDs, e.g., 64, available per Basic Service Set (BSS) currently in the IEEE 802.11ac standard, and the AP decides how to assign membership to each GID. While the main purpose of introducing GIDs is for multi-user transmissions, the membership assignment is arbitrary and under control of the AP, and furthermore may be based on any metric that the AP can use. Accordingly, the same field in the PLCP header that is used to indicate a multi-user transmission is used to indicate a multicast transmission to multiple client devices. Thus, there is no need change the standard by way of new field definitions or new fields to provide for multicast group addressing. Power-savings can be achieved by allowing a non-addressed client device to shut down as soon as it determines, from the GID information in the PLCP header (which an IEEE 802.11ac client device is already capable of decoding), that the following PPDU is not addressed to it. This shut-down point in time is shown at reference numeral 70 in FIG. 3.

Again, the GID that is otherwise defined to indicate a multi-user transmission is used according to the techniques described herein to indicate a multicast transmission to a group of client devices. In so doing, the GID provides a way to enable PHY-level multicast group addressing, and achieve better power savings for client devices that are not part of the group indicated by the GID in the PLCP header preceding a PPDU of a frame.

Reference is now made to FIG. 4 that shows an example of the information inserted in the first symbol, VHT-SIGA1, of field 54 to enable PHY-layer based multicast group addressing. There are several bits of information in the field 54 that concern the bandwidth to be used for transmissions as well as type of beamforming/spatial channels to be allocated. These are not relevant to the multicast addressing scheme described herein. The relevant information is the GID shown at reference numeral 80 that uses a plurality of bits, e.g., 6 bits (but allowing for 63 possible GIDs, one of the 64 being reserved). The location of the GID 80 is at bytes B4-B9 of VHT-SIG-A1.

In a PPDU, there are a plurality of user positions, called sub-intervals, made up of time, frequency and spatial resources. There are also bits allocated to indicate, for each of a plurality of user positions in a PPDU, how much data, if any, is transmitted in that user position (sub-interval). These bits are referred to as Number of Spatial Time Streams (NSTS), which can range from 0 to as many as 8 (though current version of the 802.11ac allow for up to 4 NSTSs). There is a set of bits that indicates the NSTS for each user position, from user position 1 to user position 4, shown at 82(1)-82(4). The AP assigns a multicast group of client devices to a particular user position in a PPDU and transmits the multicast data at that user position. The AP sends the user position information to the client devices in advance in the aforementioned GID management frame. Thus, when a client device determines that it is part of a multicast group indicated by a GID, it then looks at the NSTS bits for its user position to determine how much data, if any, to receive at that user position.

Figure 5:
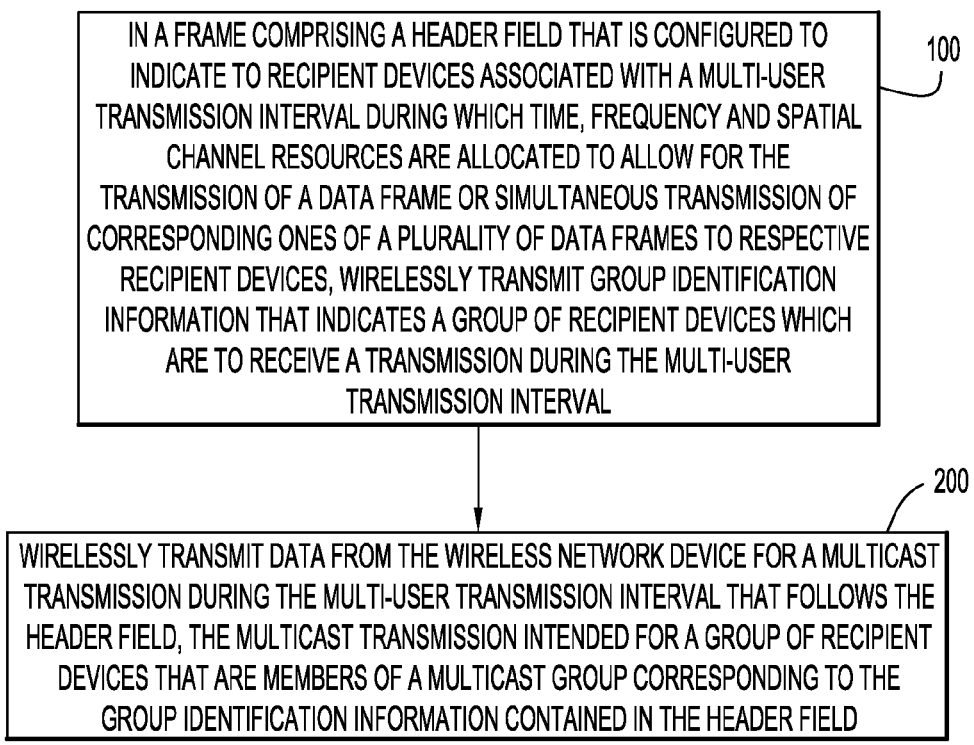
FIG. 5 is a flow chart generally depicting examples of operations performed by a wireless network access point device in sending a multicast transmission during the multi-user transmission interval of the frame.

Turning now to FIG. 5, a flow chart is shown that generally depicts the operations performed by the AP 10 when executing the AP multicast control process logic 30. At 100, the AP performs the following operation. In a frame comprising a header field that is configured to indicate to recipient devices associated with a multi-user transmission interval during which time, frequency and spatial channel resources are allocated to allow for the transmission of a data frame or simultaneous transmission of corresponding ones of a plurality of data frames to respective recipient devices, the AP wirelessly transmits group identification information that indicates a group of recipient devices which are to receive a transmission during the multi-user transmission interval. There are some additional operations that the AP performs to notify to client devices about multicast group assignments, user position assignments, etc. These operations are described hereinafter in connection with FIG. 6. At 200, the AP wirelessly transmits data for a multicast transmission during the multi-user transmission interval that follows the header field. The multicast transmission is intended for a group of recipient devices that are members of a multicast group corresponding to the group identification information contained in the header field. Moreover, the multicast transmission is sent at one of a plurality of user positions in the PPDU as selected by the AP.

Figure 6:
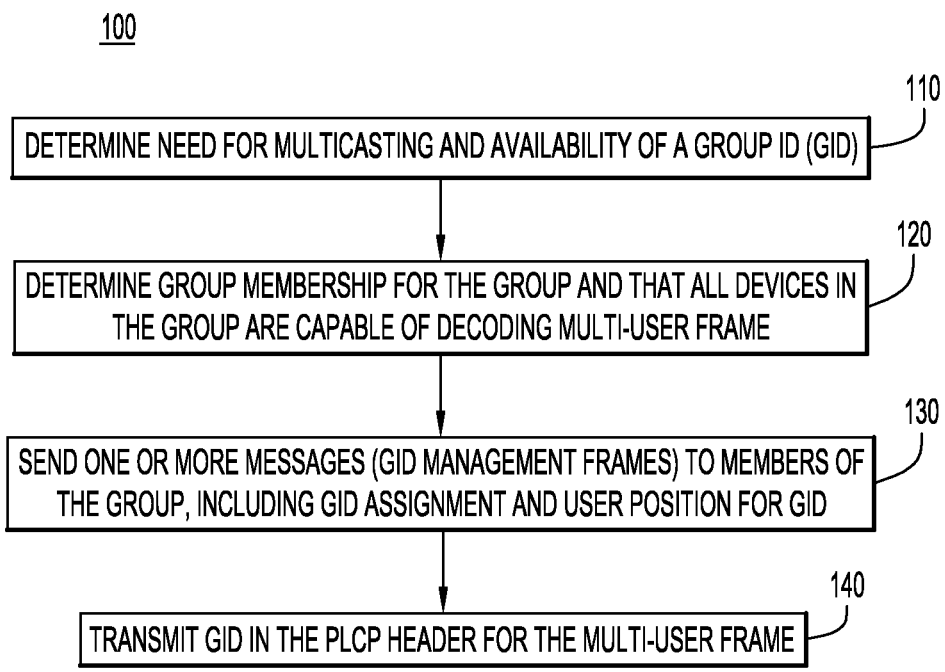
FIG. 6 is a flow chart depicting in more detail examples of operations performed by the wireless network access point device.

Reference is now made to FIG. 6 to describe further operations of the AP in setting up client devices for multicast group assignment prior to sending a multicast transmission to a multicast group of client devices. At 110, the AP determines whether/when there is a need for multicasting and the availability of a GID to use for assigning client devices to a multicast group. For example, the AP will have queued up one or more data frames to be sent to multiple client devices. Until such time, the AP may have no need to send a multicast transmission. Also at 110, the AP determines that there is a group address not already assigned to a GID that consumes a high proportion of the wireless spectrum resources and/or would otherwise have to send numerous packets per second that would negatively impact the power savings of client devices that are not the intended recipients of those packets.

Assuming that the AP has determined that it has one or more data frames to be sent to multiple client devices, then at 120, the AP determines group membership for the group and that all devices in the group are capable of decoding a multi-user frame, e.g., are IEEE 801.11ac compliant devices. In other words, the AP identifies all of the client devices that are to receive those data frames and should therefore be included in a multicast group. The AP may determine group membership in several ways, e.g. via the Directed Multicast Service (DMS) feature, More Reliable Groupcast (MRG) feature, Internet Group Management Protocol (IGMP) snooping, etc.

Also at 120, the AP selects a GID from a plurality of (available) GIDs and updates GID assignment to member clients of the group so that all group members have the same user position in the same GID that is otherwise unused. The AP decides which clients are members of a user position of a GID. The AP may move other clients to a different position for that GID. For example, the AP may reserve GIDs 0-15 for groupcast power savings, and initially assign all clients to user position 3 (an "unused" user position). When using a GID in the range 0-15, selected clients may be reassigned to user position 1. When a frame for the group needs to be sent, the AP may send it at user position 1, and ensures other user positions (e.g., 3) have 0 NSTS indicated.

The AP can use any of a variety of metric to determine multicast membership assignment. Examples of such metrics are history of occurrence of requests for the same content by several clients, or pre-registration for accessing a common streaming video via several clients.

Moreover, the AP adapts the usage of GIDs for multi-user transmissions and multicast transmissions since the same GIDs are used for both. In other words, the AP decides the portion of the total available GIDs to be assigned/used for multi-user groups for multi-user transmissions and the portion of the GIDS to be used for multicast groups for multicast transmissions. The AP can adaptively change the portion of GIDS used for multi-user groups and the portion of GIDs used for multicast groups, depending on the operation of AP and the formation of multi-user groups and multicast groups, thus changing the proportion or amount of GIDs used for multi-user transmissions and multicast transmissions on a time-varying basis. For instance, depending on the activity of clients to request access to the same content or information, e.g., in a classroom, the AP may assign more multicast GIDs, and after the end of the activity could release those multicast GIDs to the original pool of GIDs, making them available for multi-user transmissions. Also, in a more diverse set of clients where each client is less likely to request access to the same content or information as others, the AP may find it more beneficial to assign a larger portion of the GIDs to multi-user rather than multicast transmissions.

At 130, the AP sends one or more messages, e.g., one or more GID management frames, to members of the group of recipient devices to provide them with the GID corresponding to the multicast group to which the recipient device are assigned for a multicast transmission and a user position (sub-interval) assignment within that GID for the multicast transmission. In so doing, the AP supplies the intended recipient client devices with sufficient information to enable them to recognize, from the GID information included in the VHT-SIGA field of a PCLP header of frame, that there is a multicast transmission addressed to them.

At 140, the AP transmits the GID for the multicast group in the PLCP header for the multi-user frame. Client devices in the group receive and decode the GID in the PLCP header, and also look for data at a user position for that GID in the PPDU as indicated in a previously receive GID management frame.

Figure 7:
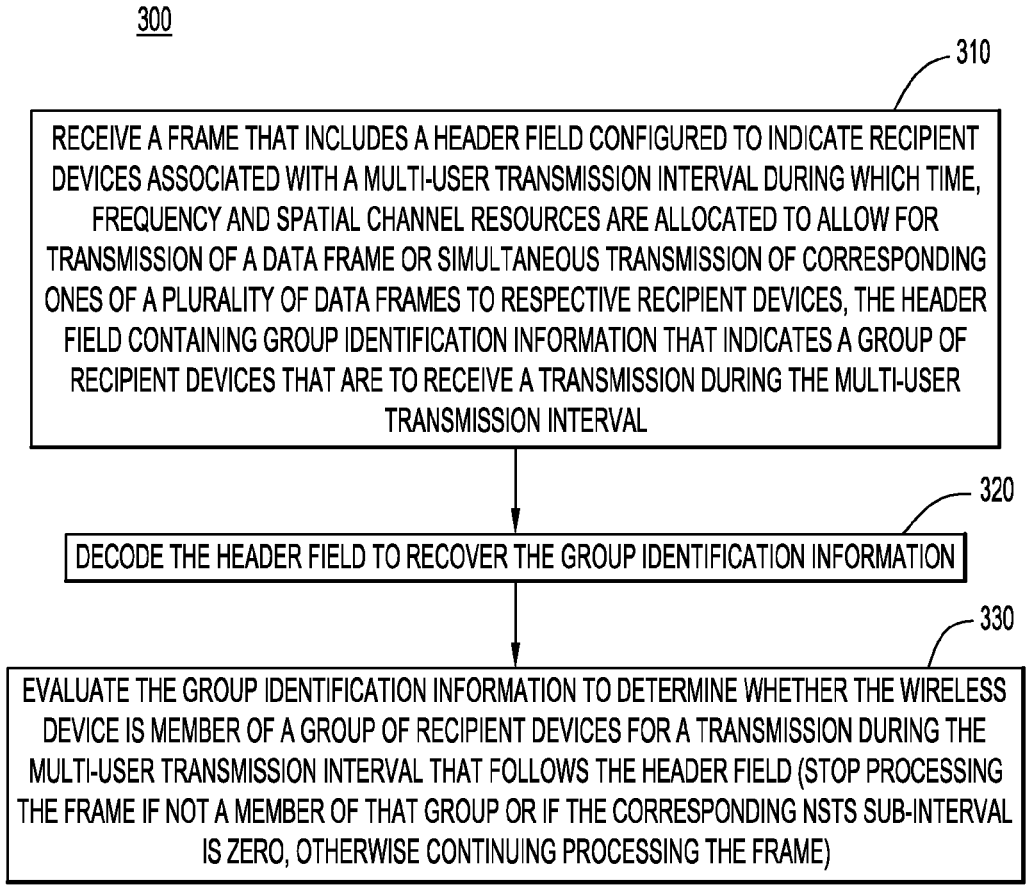
FIG. 7 is a flow chart depicting examples of operations performed by a device that is capable of decoding a multi-user frame that contains a multicast transmission.

Reference is now made to FIG. 7 that depicts the operations 300 of a client device when receiving a frame formatted as described above in connection with FIGS. 3 and 4. At 310, the client device receives a frame that includes a header field configured to indicate recipient devices associated with a multi-user transmission interval during which time, frequency and spatial channel resources are allocated to allow for of a data frame or simultaneous transmission of corresponding ones of a plurality of data frames to respective recipient devices. The header field contains group identification information that indicates a group of recipient devices that are to receive a transmission during the multi-user transmission interval. The transmission in the multi-user transmission interval could be a multi-user transmission or a multicast transmission. At 320, the client device decodes the header field to recover the group identification information. At 330, the client device evaluates the group identification information to determine whether it is member of a group of recipient devices for a transmission during the multi-user transmission interval that follows the header field. If the client device is not a member of that group or if the corresponding NSTS sub-interval is zero, the client device stops processing the frame; otherwise it continues processing the frame. That is, the client device will also determine from the information in the PLCP header how much data, if any, will be present at a particular user position in the multi-user transmission interval. Again, client devices not in the group receiving such a PLCP header realize there are 0 NSTSs for them, and directly go to sleep.

At 330, a client device will discontinue reception and processing of the frame if it is determined from the group identification information that the wireless device is not a member of the group of recipient devices for the multicast transmission or it is a member of the group of recipient devices for the multicast transmission but information included in the header indicates that an associated sub-interval for the group indicates that there is no data present. On the other hand, a client device will continue reception and processing of the frame to receive the multicast transmission during the multi-user transmission interval that follows the header field if it is determined from the group identification information that the wireless device is a member of the group of recipient devices for the multicast transmission.

The address-related fields that are used in IEEE 802.11ac are all in the PLCP header. A receiver in a client device decodes the related fields in PLCP and then decides whether to keep processing the rest of PPDU or not. Depending on how fast PLCP decoding is performed, an unintended client device could turn off a single or multiple RF chain(s), a baseband processing unit, a channel decoder, and/or MAC processor. The RF and baseband units are among the most computationally expensive units and turning them off (when not needed) significantly saves power, particularly for long PPDUs.

In summary, according to the techniques described herein, group identification information in a group address field that is otherwise used for multi-user transmissions is used as proxy for a multicast address. The foregoing is described with respect to a GID field in the VHT-SIG-A field of a PLCP header in an IEEE 802.11ac frame to address client devices within a multicast group. This group address appears in PLCP sub-layer and allows unintended recipients to drop the packets early on. These techniques are useful for any multi-user transmission, in WLAN or wireless wide area networks (e.g., cellular communication systems such as Long Term Evolution, IEEE 802.16m, etc.). The field that identifies the recipient devices for which a multi-user transmission is intended is also used for group addressing multicast data. While the concept and purpose of multi-user and multicast transmissions are totally different, the means for addressing the intended clients is the same. Therefore, the same field that addresses multi-user clients at the PHY layer can also be used to address multicast clients, achieving power saving benefits early on at the PHY layer (and in the case of IEEE 802.11ac even at PLCP sub-layer) for non-intended client devices. Thus, the group address mechanism is hidden within the multi-user GID and requires no standard/specification change. This enables an AP that is equipped with this technique to take advantage of group addressing without any changes to the IEEE 802.11ac standard.

The above description is intended by way of example only.

What is claimed is:

1. A method comprising:
   at a wireless network device, in a frame comprising a header field that is configured to indicate to recipient devices associated with a multi-user transmission interval during which time, frequency and spatial channel resources are allocated to allow for the transmission of a data frame or simultaneous transmission of corresponding ones of a plurality of data frames to respective recipient devices:
   allocating a first portion of a plurality of group identifiers for multi-user groups for sending multi-user transmissions during the multi-user transmission interval and a second portion of the plurality of group identifiers for multicast groups for sending multicast transmissions during the multi-user transmission interval, wherein the allocating includes determining which of the recipient devices are capable of decoding the header field to obtain and interpret the group identification information included in the header field, and not assigning to a group any recipient devices that are not capable of decoding the header field to obtain and interpret the group identification information included in the header field;
   generating group identification information comprising a group identifier selected from the plurality of group identifiers;
   and wirelessly transmitting the group identification information that indicates a group of recipient devices which are to receive a transmission during the multi-user transmission interval;
   and wirelessly transmitting data from the wireless network device for a multicast transmission during the multi-user transmission interval that follows the header field, the multicast transmission intended for a group of recipient devices that are members of a multicast group corresponding to the group identification information contained in the header field.

2. The method of claim 1, and further comprising adaptively changing the first portion of the group identifiers allocated for multi-user groups and the second portion of group identifiers allocated for multicast groups.

3. The method of claim 1, and further comprising, prior to transmitting the frame, transmitting to the recipient devices one or more management frames that include a group identifier corresponding to a group to which the recipient devices are assigned.

4. The method of claim 3, and wherein transmitting the one or more management frames comprises transmitting information indicating one of a plurality of sub-intervals within the multi-user transmission interval in which the multicast transmission is to be transmitted.

5. The method of claim 4, and further comprising transmitting in the header field an indication for each sub-interval how much data, if any, will be transmitted in that sub-interval.

6. The method of claim 1, wherein the header field is part of a Physical Layer Convergence Procedure (PCLP) header that is transmitted prior to a PLCP data unit field in accordance with the IEEE 802.11ac wireless communication standard.

7. An apparatus comprising:
   a wireless transceiver unit configured generate signals for wireless transmission in a wireless network;
   and a controller coupled to the wireless transceiver unit, the controller configured to:
   generate group identification information for a group of recipient devices to receive a transmission during a multi-user transmission interval of a frame, during which multi-user transmission interval time, frequency and spatial channel resources are allocated to allow for the transmission of a data frame or simultaneous transmission of corresponding ones of a plurality of data frames to respective recipient devices;
   allocate a first portion of a plurality of group identifiers for multi-user groups for sending multi-user transmissions during the multi-user transmission interval and a second portion of the plurality of group identifiers for multicast groups for sending multicast transmissions during the multi-user transmission interval, wherein to perform the allocate operation the controller is configured to determine which of the recipient devices are capable of decoding the header field to obtain and interpret the group identification information included in the header field, and not assign to a group any recipient devices that are not capable of decoding the header field to obtain and interpret the group identification information included in the header field;

select a group identifier from the plurality of group identifiers as group identification information;

include the group identification information in a header field of the frame for transmission prior to the multi-user transmission interval, wherein the header field is configured to indicate to recipient devices associated with multi-user transmission interval;

and supply data to the wireless transceiver unit for transmitting a multicast transmission during the multi-user transmission interval, the multicast transmission intended for a group of recipient devices that are members of a multicast group corresponding to the group identification information contained in the header field.

8. The apparatus of claim 1, wherein the controller is configured to adaptively change the first portion of the group identifiers allocated for multi-user groups and the second portion of group identifiers allocated for multicast groups.

9. The apparatus of claim 7, wherein the controller is further configured to generate, for transmission to the group of recipient devices prior to transmitting the frame, one or more management frames that include a group identifier corresponding to a group to which the recipient devices are assigned.

10. The apparatus of claim 9, wherein the controller is configured to include in the one or more management frames information indicating one of a plurality of sub-intervals within the multi-user transmission interval in which the multicast transmission is to be transmitted.

11. One or more non-transitory computer readable storage media encoded with software comprising computer executable instructions and when the software is executed operable to:

generate group identification information for a group of recipient devices to receive a transmission during a multi-user transmission interval of a frame, during which multi-user transmission interval time, frequency and spatial channel resources are allocated to allow for the transmission of a data frame or simultaneous transmission of corresponding ones of a plurality of data frames to respective recipient devices;

allocate a first portion of a plurality of group identifiers for multi-user groups for sending multi-user transmissions during the multi-user transmission interval and a second portion of the plurality of group identifiers for multicast groups for sending multicast transmissions during the multi-user transmission interval, wherein the instructions to cause the processor to allocate includes instructions to cause the processor to determine which of the recipient devices are capable of decoding the header field to obtain and interpret the group identification information included in the header field, and not assign to a group any recipient devices that are not capable of decoding the header field to obtain and interpret the group identification information included in the header field;

select a group identifier from the plurality of group identifiers as group identification information;

include the group identification information in a header field of the frame for transmission prior to the multi-user transmission interval, wherein the header field is configured to indicate to recipient devices associated with multi-user transmission interval;

and supply data to a wireless transceiver unit for transmitting a multicast transmission during the multi-user transmission interval, the multicast transmission intended for a group of recipient devices that are members of a multicast group corresponding to the group identification information contained in the header field.

12. The non-transitory computer readable storage media of claim 11, and further comprising instructions that are operable to generate, for transmission to the group of recipient devices prior to transmitting the frame, one or more management frames that include a group identifier corresponding to a group to which the recipient devices are assigned.

13. The non-transitory computer readable storage media of claim 12, and further comprising instructions that are operable to include in the one or more management frames information indicating one of a plurality of sub-intervals within the multi-user transmission interval in which the multicast transmission is to be transmitted.

14. A method comprising:

at a wireless device, receiving a frame that includes a header field configured to indicate recipient devices associated with a multi-user transmission interval during which time, frequency and spatial channel resources are allocated to allow for the transmission of a data frame or simultaneous transmission of corresponding ones of a plurality of data frames to respective recipient devices, the header field containing group identification information that indicates a group of recipient devices that are to receive a transmission during the multi-user transmission interval, wherein the group identification information is selected from a plurality of group identifiers, wherein a first portion of the plurality of group identifiers are allocated for multi-user groups for sending multi-user transmissions during the multi-user transmission interval and a second portion of the plurality of group identifiers are allocated for multicast groups for sending multicast transmissions during the multi-user transmission interval, wherein the plurality of group identifiers are allocated to ones of the recipient devices determined to be capable of decoding the header field to obtain and interpret the group identification information included in the header field, and are not assigned to a group of any recipient devices that are not capable of decoding the header field to obtain and interpret the group identification information included in the header field;

decoding the header field to recover the group identification information;

and evaluating the group identification information to determine whether the wireless device is a member of a group of recipient devices for a multicast transmission during the multi-user transmission interval that follows the header field.

15. The method of claim 14, and further comprising discontinuing reception and processing of the frame if it is determined from the group identification information that the wireless device is not a member of the first group of recipient devices for the multicast transmission or it is a member of the second group of recipient devices for the multicast transmission but information included in the header indicates that an associated sub-interval for the group indicates no data is present.

16. The method of claim 14, and further comprising continuing reception and processing of the frame to receive the multicast transmission during the multi-user transmission interval that follows the header field if it is determined from the group identification information that the wireless device is a member of the group of recipient devices for the multicast transmission.

* * * * *